(12) United States Patent
Kim et al.

(10) Patent No.: US 9,066,533 B2
(45) Date of Patent: Jun. 30, 2015

(54) **METHOD FOR MANUFACTURING JAM USING FRUITS OF *ACANTHOPANAX SENTICOSUS***

(71) Applicants: Miyoung Kim, Gyeonggi-do (KR);
Byung-no Lee, Gyeonggi-do (KR);
Seunghae Lee, Gyeonggi-do (KR);
Seunggyu Lee, Gyeonggi-do (KR)

(72) Inventors: Miyoung Kim, Gyeonggi-do (KR);
Byung-no Lee, Gyeonggi-do (KR);
Seunghae Lee, Gyeonggi-do (KR);
Seunggyu Lee, Gyeonggi-do (KR)

( * ) Notice: Subject to any disclaimer, the term of this patent is extended or adjusted under 35 U.S.C. 154(b) by 0 days.

(21) Appl. No.: 14/224,030

(22) Filed: Mar. 24, 2014

(65) Prior Publication Data
US 2014/0287093 A1 Sep. 25, 2014

(30) Foreign Application Priority Data

Mar. 22, 2013 (KR) ........................ 10-2013-0030798

(51) Int. Cl.
*A23L 1/06* (2006.01)

(52) U.S. Cl.
CPC ............. *A23L 1/062* (2013.01); *A23V 2002/00* (2013.01)

(58) Field of Classification Search
CPC ........................................................ A23L 1/06
USPC ............................................................ 426/8
See application file for complete search history.

(56) References Cited

U.S. PATENT DOCUMENTS

| | | | |
|---|---|---|---|
| 1,451,135 A * | 4/1923 | Wright et al. ................ | 426/577 |
| 2,382,407 A * | 8/1945 | Erickson et al. ............. | 426/655 |
| 5,336,516 A * | 8/1994 | Yamamoto et al. .......... | 426/615 |
| 6,120,824 A * | 9/2000 | Mendez ........................ | 426/397 |
| 2004/0142047 A1 * | 7/2004 | Yoon et al. ................... | 424/728 |
| 2009/0202677 A1 * | 8/2009 | Kondo .......................... | 426/52 |
| 2012/0045547 A1 * | 2/2012 | Kim .............................. | 426/46 |

FOREIGN PATENT DOCUMENTS

| | | | | |
|---|---|---|---|---|
| KR | 10-2007-0087868 | * | 8/2007 | ............. A61K 36/73 |
| KR | 1020090044025 | | 5/2009 | |
| KR | 10-2010-0018993 | * | 2/2010 | ............... A23L 1/08 |
| KR | 1020120119809 | | 10/2012 | |
| KR | 1020130028827 | | 3/2013 | |

OTHER PUBLICATIONS

W Tang CN 101744160 Jun. 23, 2010 Derwent Abstract 2 pages.*

* cited by examiner

*Primary Examiner* — Felicia King
(74) *Attorney, Agent, or Firm* — Novick, Kim & Lee, PLLC; Jae Youn Kim (57) ABSTRACT

A method for manufacturing jam using *Acanthopanax senticosus* fruits. *Acanthopanax senticosus* fruits are mashed, added with sugar, stored in a container, and fermented and ripened. The fermented and ripened *Acanthopanax senticosus* fruits are heated, added with mineral water, and compressed using a sieve to separate out the seeds and skins, and obtain a flesh extract of the *Acanthopanax senticosus*. The flesh extract is boiled down while stirring and 5-15 parts of sugar are added. Heat is reduced and salt is added to thoroughly-steam the boiled-down flesh extract. The thoroughly steamed flesh extract is put into a glass jar, boiled in a water bath with the lid of the glass jar tightly sealed, and cooled down to vacuum seal the glass jar. A final ripening process is performed. The jam provides an improved flavor of the *Acanthopanax senticosus* fruits and helps people to stay healthy due to the useful pharmacological effects of *Acanthopanax senticosus* fruits.

1 Claim, 7 Drawing Sheets

METHOD FOR MANUFACTURING JAM USING FRUITS OF *ACANTHOPANAX SENTICOSUS*

CLAIM OF FOREIGN PRIORITY

The present application claims priority to Korean Application No. 10-2013-0030798, now Korean Patent No. 10-1295951, filed Mar. 22, 2010, which application is incorporated herein by reference.

FIELD OF THE INVENTION

The present invention relates to a method for manufacturing a jam, and more particularly, to a method for manufacturing a jam using fermented and ripened fruits of *Acanthopanax senticosus*.

BACKGROUND OF THE INVENTION

*Acanthopanax senticosus*, which belongs to Araliaceae family, is a medicinal plant containing many components useful to humans, and is thus being called "a second wild ginseng." All parts of the plant including roots, stems, leaves, fruits, and flowers can be used as medicinal materials.

The *Acanthopanax senticosus* fruits are widely known to enhance immune functions and strengthen the liver, thus being effective in detoxification. In addition, the fruits are also known to contain acanthoic acid and chiisanoside and are effective in the treatment of cancer, inflammation, and rheumatoid arthritis.

In addition, the *Acanthopanax senticosus* fruits can help to prevent allergies, and are effective in the treatment of chronic bronchitis, allergic rhinitis, and prostate diseases. The fruits also help to release stress and are effective in increasing the number of white blood cells in the blood.

The *Acanthopanax senticosus* fruits having the above efficacies have been used in manufacturing liquors, teas, resins, extracts, health foods, etc., and as disclosed in Korea Patent No. 10-0669233 and Korea Patent Application Publication No. 10-2004-0075425, have been developed into various health-related products. When the *Acanthopanax senticosus* fruits are used in manufacturing resins, extracts, health foods, etc., there is a limitation on the age of people who can take the products. When the *Acanthopanax senticosus* fruits are used in manufacturing resins, extracts, health foods, etc., there has been a limitation in the customer groups who favor the products due to the rather bitter taste and unique herb flavor.

SUMMARY OF THE INVENTION

Accordingly, the present invention has been made keeping in mind the above problems occurring in the prior art, and an object of the present invention is to provide a method for manufacturing a jam using *Acanthopanax senticosus* fruits which can be easily taken by men and women of all ages without limitation in the customer age group after spreading it on breads or cakes, and also can be eaten without any repulsion due to the unique sweet taste of the jam. Furthermore, through fermentation and ripening, the jam containing *Acanthopanax senticosus* fruits can be stored for long periods and provides an improved unique and deep flavor of the *Acanthopanax senticosus* fruit and helps people to stay healthy due to useful pharmacological effects of *Acanthopanax senticosus* fruits.

In order to accomplish the above objective of the present invention, there is provided a method for manufacturing a jam using *Acanthopanax senticosus* fruits including a process of handling raw materials, wherein *Acanthopanax senticosus* fruits are mashed, added with sugar, stored in a container, and fermented and ripened; a process of obtaining a flesh extract of the *Acanthopanax senticosus*, wherein the fermented and ripened *Acanthopanax senticosus* fruits are heated, added with mineral water, compressed using a sieve to separate seeds and skins, and to obtain a flesh extract of the *Acanthopanax senticosus* sieved out therefrom; a process of boiling down the flesh extract of the *Acanthopanax senticosus*, wherein the flesh extract of the *Acanthopanax senticosus* is boiled down while stirring, and 5-15 parts by weight of sugar relative to 100 parts by weight of the flesh extract of the *Acanthopanax senticosus* are added thereto; a process of thorough-steaming, wherein the heating is reduced, and the boiled-down flesh extract of the *Acanthopanax senticosus* is added with salt while stirring; a vacuum packing process, wherein the thoroughly-steamed flesh extract of the *Acanthopanax senticosus* is put into a glass jar, and boiled in a water bath with the lid of the glass jar tightly sealed and then cooled down to vacuum seal the inside of the glass jar; and a final ripening process to ripen the thoroughly-steamed flesh extract of the *Acanthopanax senticosus* in a shaded ripening room set at 13-16° C.

In particular, the method of the present invention with regard to handling raw materials is also characterized in that it includes processes such as a washing and drying, wherein *Acanthopanax senticosus* fruits are washed and dried; an adding process, wherein *Acanthopanax senticosus* fruits are mashed, added with 30-50 parts by weight of sugar relative to 100 parts by weight of *Acanthopanax senticosus* fruits, and mixed thereafter; a sealing process, wherein the *Acanthopanax senticosus* fruits added with sugar are put into a container, and the mouth of the container is covered with cloth or Hanji, a traditional Korean paper handmade from mulberry trees, and sealed with a rubber band; a fermentation process, wherein the container is stored in a fermentation room set at 25-27° C. for 3 to 5 months to ferment the *Acanthopanax senticosus* fruits; and a ripening process, wherein the container is stored in a ripening room set at 13-16° C. for 3 to 5 months to ripen the *Acanthopanax senticosus* fruits.

In particular, the fermentation process of the present invention is characterized in that the fermentation process includes opening the container a plurality of times during the fermentation process to mix the mixture of the *Acanthopanax senticosus* fruits and sugar.

In addition, a process of obtaining a flesh extract of the *Acanthopanax senticosus* of the present invention is characterized in that the process includes heating the fermented and ripened *Acanthopanax senticosus* fruits and adding 50-150 parts by weight of mineral water relative to 100 parts by weight of *Acanthopanax senticosus* fruits.

In addition, the process of obtaining a flesh extract of the *Acanthopanax senticosus* of the present invention is characterized in that it includes compressing the fermented and ripened *Acanthopanax senticosus* fruits a plurality of times using a sieve to extract a flesh of the *Acanthopanax senticosus*.

Furthermore, a thorough-steaming process of the present invention is characterized in that it includes steaming by adding 0.05-0.1 part by weight of salt relative to 100 parts by weight of the boiled-down flesh extract of the *Acanthopanax senticosus*.

According to the present invention, jam manufactured using *Acanthopanax senticosus* fruits can be easily consumed by men and women of all ages without limitation in the customer age group after spreading the jam on breads or cakes, and the jam manufactured using *Acanthopanax senticosus* fruits can be eaten without any repulsion due to the unique sweet taste of the jam. Furthermore, through fermentation and ripening, the jam can be stored for long periods and provides an improved unique and deep flavor of the *Acanthopanax senticosus* fruit. Jam manufactured using *Acanthopanax senticosus* fruits helps people to stay healthy due to the useful pharmacological effects of *Acanthopanax senticosus* fruits.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE DRAWINGS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
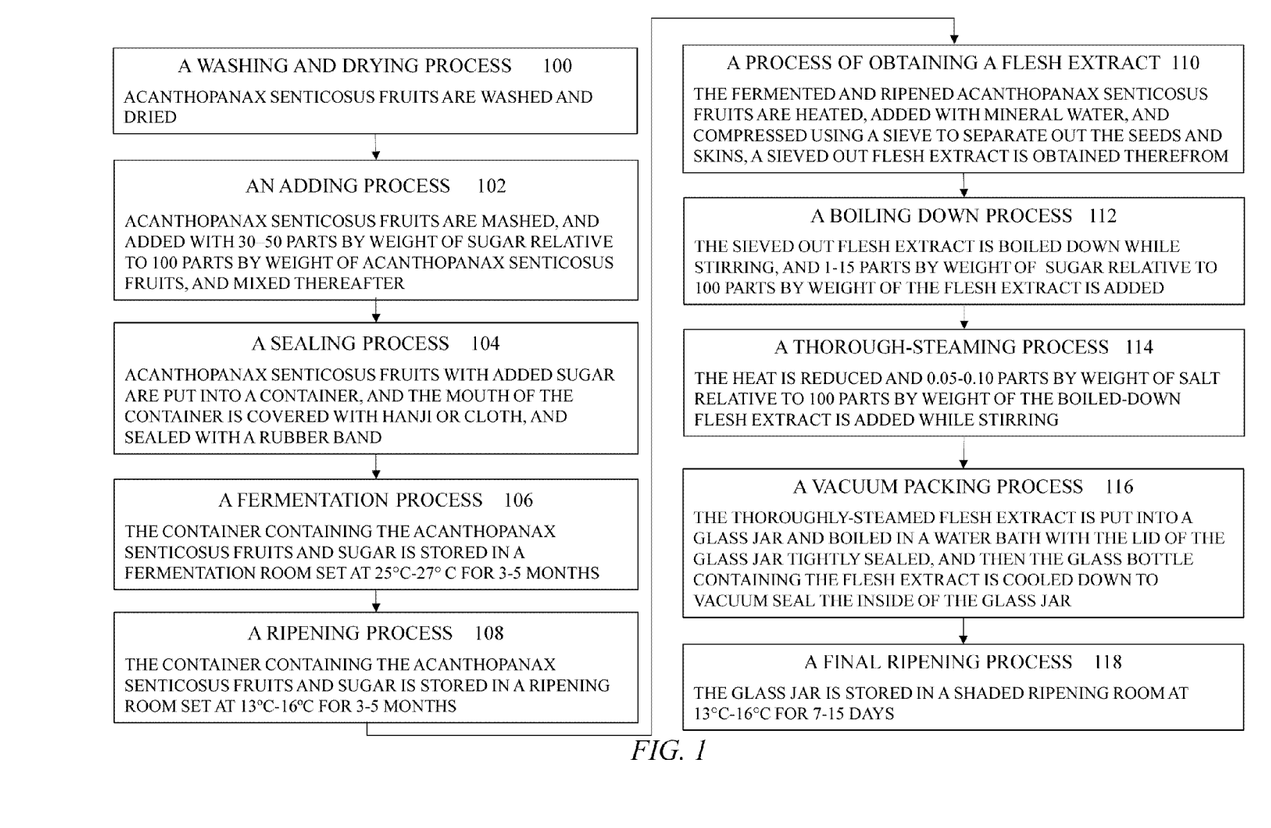
FIG. 1 is a flowchart illustrating a method for manufacturing a jam using *Acanthopanax senticosus* fruits according to an exemplary embodiment of the present invention.

As shown in FIG. 1, the method for manufacturing a jam using *Acanthopanax senticosus* fruits via long term fermentation and ripening includes a washing and drying process 100, an adding process 102, a sealing process 104, a fermentation process 106, a ripening process 108, a process of obtaining a flesh extract 110, a boiling-down process 112, a thorough-steaming process 114, a vacuum packing process 116, and a final ripening process 118, and the details are described further herein below.

Washing and Drying Process

The washing and drying process 100 of the present invention is a process, wherein *Acanthopanax senticosus* fruits are washed with water, and the *Acanthopanax senticosus* fruits are dried thereafter.

That is, the washing and drying process includes collecting *Acanthopanax senticosus* fruits, known to enhance immune responses, hepatic functions, and to be effective in the prevention and treatment of anticancer/anti-inflammation, arthritis, prostatitis, and allergies, from the *Acanthopanax senticosus* trees. Thoroughly washing the collected *Acanthopanax senticosus* fruits and drying the water from the *Acanthopanax senticosus* fruits in the shade.

Adding Process

Figure 2A:
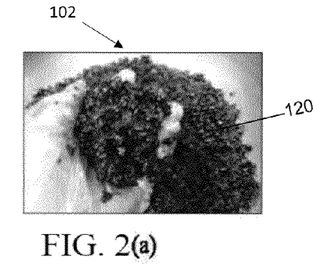
FIGS. 2a-2g show respective pictures for an adding process, a sealing process, a fermentation process, and a ripening process in the method for manufacturing a jam using *Acanthopanax senticosus* fruits according to an exemplary embodiment of the present invention.
Figure 2B:
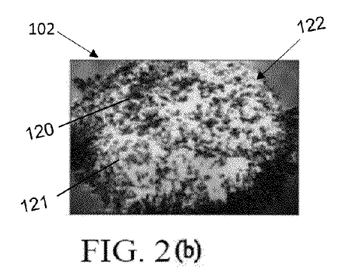
Figure 2C:
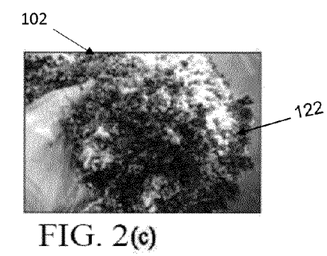

The adding process 102 of the present invention is a process, wherein, after the *Acanthopanax senticosus* fruits are dried, the *Acanthopanax senticosus* fruits 120 are mashed by kneading as shown in FIG. 2(a), added with sugar 121, and mixed thereafter as shown in FIG. 2(b) and FIG. 2(c), to thereby prevent the resultant from being spoiled or putrefied due to the presence of worms or fungi during the course of fermentation or ripening.

In the adding process, sugar is preferably added in the amount of 30-50 parts by weight relative to 100 parts by weight of *Acanthopanax senticosus* fruits. When sugar is added less than 30 parts by weight, the above-mentioned effects may be deteriorated. In contrast, when sugar is added more than 50 parts by weight, it increases the sweetness too much and it may deteriorate the efficacies of the *Acanthopanax senticosus* fruits and also decrease the quality of its edible texture.

Sealing Process

Figure 2D:
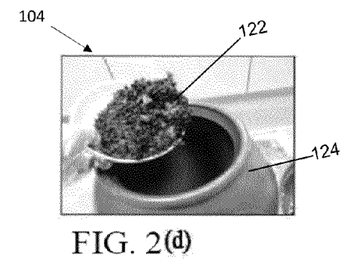
Figure 2E:
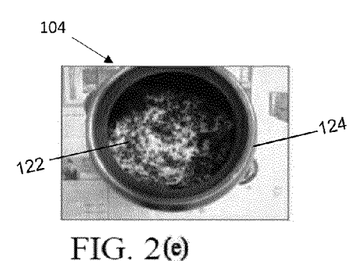
Figure 2F:
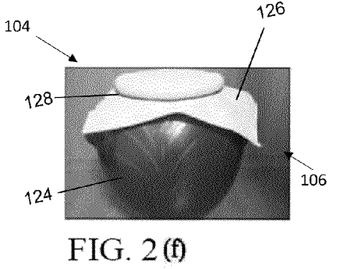
Figure 2G:
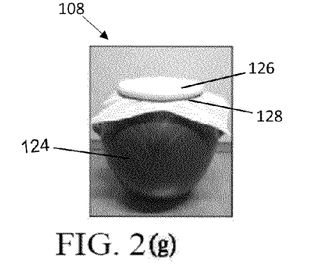
Figure 3A:
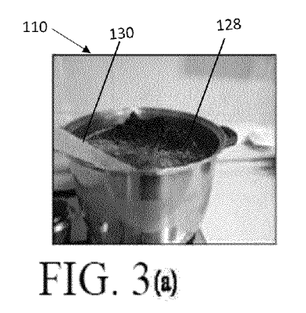
FIGS. 3a-3f show respective pictures for a process of obtaining a flesh extract of the *Acanthopanax senticosus* in the method for manufacturing a jam using *Acanthopanax senticosus* fruits according to an exemplary embodiment of the present invention.
Figure 3B:
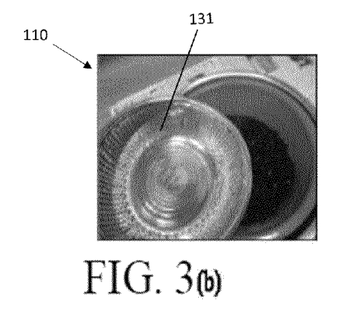
Figure 3C:
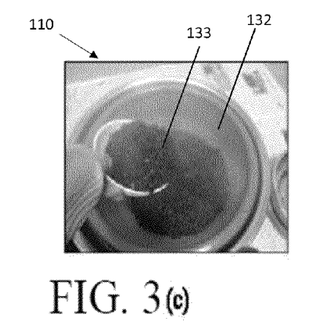
Figure 3D:
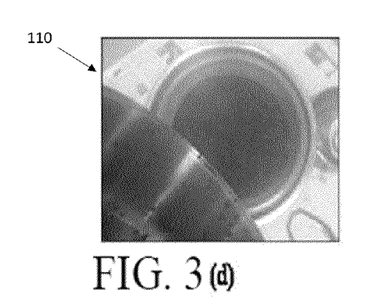
Figure 3E:
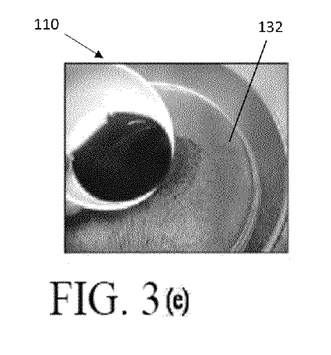
Figure 3F:
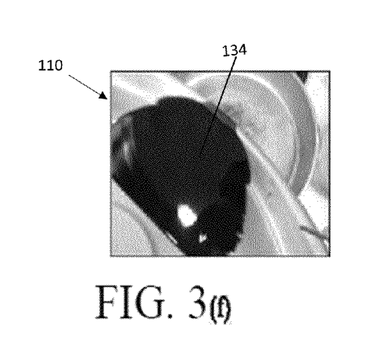

The sealing process 104 of the present invention is a process, wherein the *Acanthopanax senticosus* fruits and sugar mixture 122 is put into a container 124, as shown in FIG. 2(d) and FIG. 2(e) and the mouth of the container 124 is covered with a cloth or a Hanji 126, a traditional Korean paper handmade from mulberry trees, as shown in FIG. 2(f), and tightly sealed with a rubber band 128.

In other words, in the adding process, the *Acanthopanax senticosus* fruits with added sugar are put into a container such as a red clay pot, and the mouth of the container is covered with Hanji or cloth, and the container is tightly sealed by tying the container with a rubber band, to thereby prevent worms or external impurities from entering the container.

Fermentation Process

The fermentation process 106 of the present invention is a process, wherein the tightly sealed container 124 shown in FIG. 2(f) is stored in a fermentation room. During the fermentation process, the mixture containing the *Acanthopanax senticosus* fruits and sugar is fermented for a long term period. Accordingly, the sugar is well dissolved in the *Acanthopanax senticosus* fruits to give rise to a deep flavor and unique taste of the jam manufactured therefrom, thus enabling effective utilization of the active ingredients contained in the flesh and seeds of *Acanthopanax senticosus* fruits while removing the unfavorable bitterness and herbal flavor of the *Acanthopanax senticosus* fruits.

The fermentation room is preferably set at from 25° C. to 27° C. When the temperature is outside the above range the level of fermentation of the *Acanthopanax senticosus* fruits may become deteriorated or excessive thus decreasing the above-mentioned efficacies of the *Acanthopanax senticosus* fruits.

Additionally, the container is preferably stored in a fermentation room for from 3 months to 5 months to ferment the mixture of *Acanthopanax senticosus* fruits and sugar. When the container is stored for less or above the above range the level of fermentation of the *Acanthopanax senticosus* fruits may become deteriorated or excessive thus decreasing the above-mentioned efficacies of the *Acanthopanax senticosus* fruits.

In addition, the container is preferably opened a plurality of times during the fermentation process to mix the mixture of *Acanthopanax senticosus* fruits and sugar. This is because by evenly mixing the mixture of *Acanthopanax senticosus* fruits and sugar contained in the container the sugar therein can be well dissolved, and oxygen can be supplied to thereby effectively facilitate fermentation due to gas release.

Stirring the mixture of *Acanthopanax senticosus* fruits and sugar releases gas being spontaneously produced during the fermentation process and supplies oxygen simultaneously. Releasing gas produced during the fermentation process and supplying oxygen simultaneously can prevent the fermentation from proceeding toward alcohol fermentation or an acetic acid fermentation thus preventing the main objective of manufacturing a jam using *Acanthopanax senticosus* fruits from being distorted. More specifically, the container is preferably opened two or three times a week during the storage period to mix the mixture of *Acanthopanax senticosus* fruits and sugar.

Ripening Process

The ripening process 108 of the present invention is a process, wherein the container including the fermented *Acanthopanax senticosus* fruits is stored in a ripening room for a long period as shown in FIG. 2(*g*) to further increase the fermentation described above thereby eliminating the bitter taste and herbal flavors, while improving the favored deep and unique taste of the fresh jam, and also removing harmful ingredients naturally entered into the *Acanthopanax senticosus* fruits due to acid rain or pollution during the growth.

In particular, the ripening room is preferably set at a temperature from 13° C. to 16° C. When the temperature is outside the above range the level of ripening of the *Acanthopanax senticosus* fruits may be deteriorated or excessive thereby deteriorating the effects of eliminating the harmful ingredients.

In addition, the container is preferably stored in the ripening room for a period from 3 months to 5 months to ferment the *Acanthopanax senticosus* fruits. When the storage period is outside the above range, the level of ripening of the *Acanthopanax senticosus* fruits may be deteriorated or excessive thereby deteriorating the effects of eliminating the harmful ingredients.

As such, without the above fermentation process and the ripening process of the mixture of the *Acanthopanax senticosus* fruits and sugar, the deep and unique taste of the jam prepared by using the *Acanthopanax senticosus* fruits and the active ingredients contained within the flesh and seeds of the *Acanthopanax senticosus* may not be obtained. Accordingly, the fermentation process and the ripening process of the mixture of the *Acanthopanax senticosus* fruits and sugar are essential in the present invention.

Process of Obtaining a Flesh Extract

The process of obtaining a flesh extract 110 of the present invention is a process, wherein the fermented and ripened mixture of the *Acanthopanax senticosus* fruits and sugar 128 is heated, mineral water is added, and the mixture with added mineral water is compressed a plurality of times using a sieve 130 to separate out seeds and skins and thereby obtain a flesh extract 132 of the *Acanthopanax senticosus* fruits. That is, it is a process of obtaining a flesh extract, which is the main raw material for manufacturing a jam of the *Acanthopanax senticosus* fruits, from the *Acanthopanax senticosus* fruits.

In particular, the fermented and ripened mixture of the *Acanthopanax senticosus* fruits and sugar 128 is heated under a strong fire, and when the mixture starts to boil the mixture is heated further for 30 minutes, wherein the mixture is stirred using a wooden spatula 130 or the like while heating as shown in FIG. 3(*a*) so that the mixture of the *Acanthopanax senticosus* fruits and sugar may not stick to a container or its shape may not be rapidly spoiled.

Furthermore, mineral water 131 is added to the fermented and ripened mixture of the *Acanthopanax senticosus* fruits and sugar as shown in FIG. 3(*b*), wherein the mineral water is preferably in the amount of 50-150 parts by weight of mineral water relative to 100 parts by weight of *Acanthopanax senticosus* fruits. When the amount of mineral water added is outside the above range, the rate of obtaining the flesh extract according to the change in concentration of the mixture of the *Acanthopanax senticosus* fruits and sugar may decrease. Accordingly, more preferably, the weight ratio between mineral water and the mixture of the *Acanthopanax senticosus* fruits and sugar should be 1:1.

In addition, by compressing the mixture through a sieve 132, the seeds and skins 133 from the mixture of the *Acanthopanax senticosus* fruits and sugar with added mineral water are separated out, as shown in FIG. 3(*c*) and FIG. 3(*d*). The mixture is compressed through the sieve several times to obtain a flesh extract and separate out the seeds and skins therefrom. By compressing the flesh extract against a sieve a plurality of times as shown in FIG. 3(*e*) and FIG. 3(*f*), a pure flesh extract 134 which is completely removed from the seeds and skins of the *Acanthopanax senticosus* fruits can be obtained.

Process of Boiling-Down

The boiling-down process 112 of the present invention is a process, wherein the above obtained flesh extract 134 is heated while stirring to be boiled down. In particular, the flesh extract is added with sugar to induce a sweet taste unique to the jam, and the above obtained flesh extract is made into a fluid liquid such as a sol or a gel.

Figure 4A:
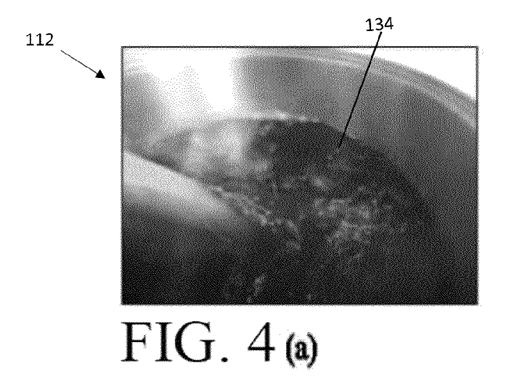
FIGS. 4a-4c show respective pictures for a process of boiling down the flesh extract in the method for manufacturing a jam using *Acanthopanax senticosus* fruits according to an exemplary embodiment of the present invention.
Figure 4B:
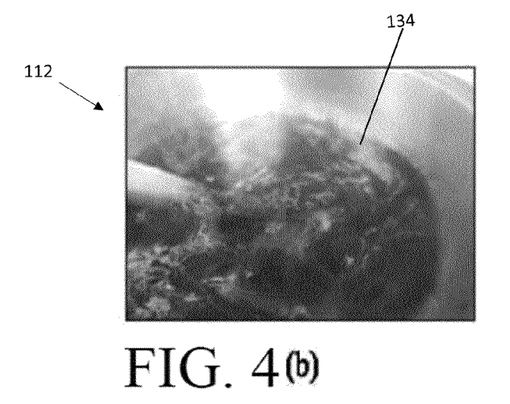

In particular, in boiling down the flesh extract by heating as shown in FIG. 4(*a*) and FIG. 4(*b*), the flesh extract is preferably boiled down by slowly stirring with a wooden spatula for 5 hours while maintaining a medium heat. Otherwise, the flesh extract may stick to a container or be burnt and its shape may be rapidly spoiled, and may not turn into a fluid liquid such as a sol or a gel.

Figure 4C:
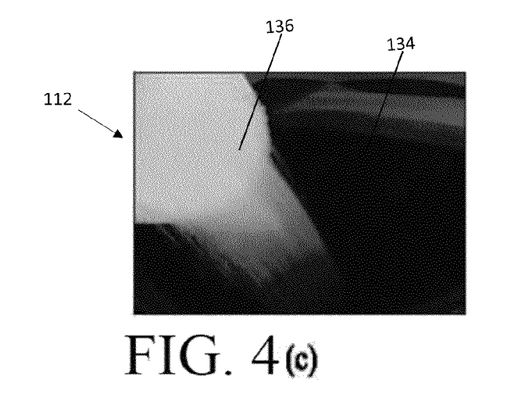

Additionally, sugar 136 is added to the flesh extract to be boiled down, as shown in FIG. 4(*c*). The sugar is preferably added in the amount of 5-15 parts by weight relative to 100 parts by weight of the flesh extract of the *Acanthopanax senticosus*. When sugar 136 is added less than 5 parts by weight, the unique sweet taste of a jam may decrease thereby deteriorating the quality of its edible texture. In contrast, when sugar 136 is added more than 15 parts by weight, it may produce an excessively sweet taste thereby not being able to exhibit the efficacies of the *Acanthopanax senticosus* fruits, and may also cause an adverse effect to decrease the quality of its edible texture.

Process of Thorough-Steaming

The process of thorough-steaming 114 of the present invention is a process, wherein after the boiling-down process, the heat is reduced, and the boiled-down flesh extract of the *Acanthopanax senticosus* is added with a salt while stirring and steamed, thereby increasing the sweet taste of the flesh extract of the *Acanthopanax senticosus* and providing the unique deep and special taste of a jam.

Figure 5A:
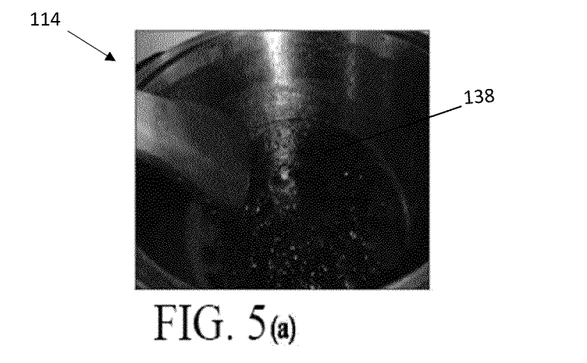
FIGS. 5a-5c show respective pictures for a process of thorough-steaming the boiled-down flesh extract in the method for manufacturing a jam using *Acanthopanax senticosus* fruits according to an exemplary embodiment of the present invention.
Figure 5B:
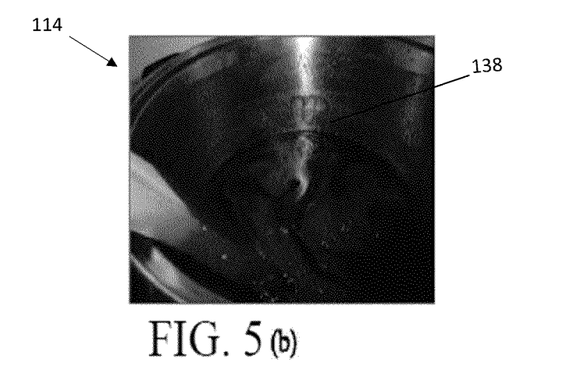

In particular, as shown in FIG. 5(*a*) and FIG. 5(*b*), the boiled-down flesh 138 extract is preferably stirred with a wooden spatula for one hour after reducing the heat so that the flesh extract may not stick to a container or be burnt.

Figure 5C:
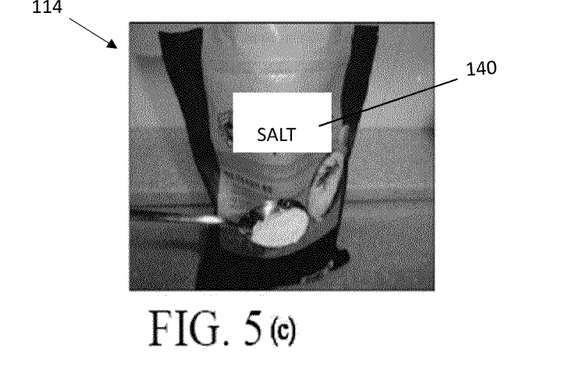
Figure 6A:
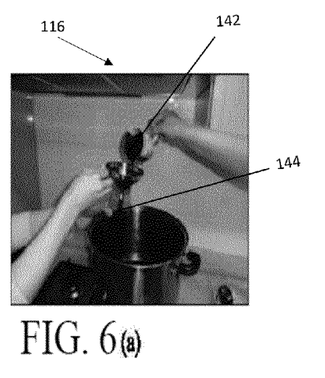
FIGS. 6a-6d show respective pictures for a vacuum packing process in the method for manufacturing a jam using *Acanthopanax senticosus* fruits according to an exemplary embodiment of the present invention.
Figure 6B:
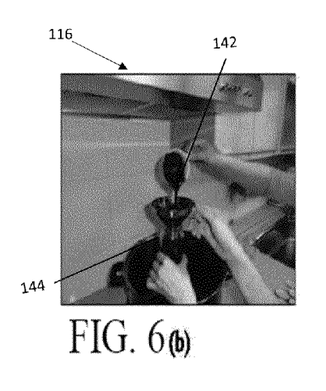
Figure 6C:
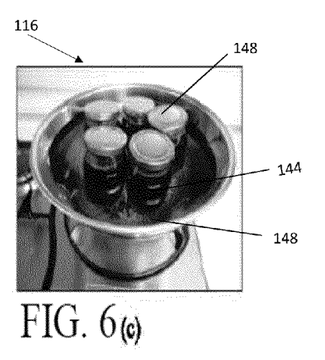
Figure 6D:
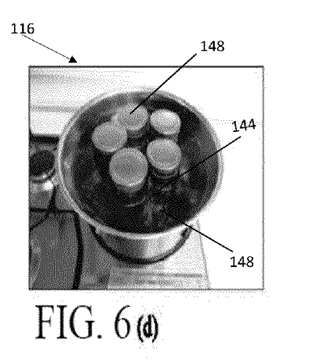

In addition, salt 140 is added during the thorough-steaming process as shown in FIG. 5(*c*). Salt 140 is preferably added in the amount of 0.05-0.1 part by weight of salt relative to 100 parts by weight of the boiled-down flesh extract of the *Acanthopanax senticosus*. When salt is added either less than or greater than the above range it will deteriorate the effect of enhancing the uniquely deep and special taste of the jam to be provided by improving the sweet taste while reducing the amount of sugar.

Vacuum Packing Process

The vacuum packing process 116 of the present invention is a process, wherein the thoroughly-steamed flesh extract is put into a glass jar while hot, boiled in a water bath with a lid of the glass jar tightly sealed, and then cooled down to vacuum seal the inside of the glass jar, thereby preventing the jam manufactured using *Acanthopanax senticosus* fruits from being spoiled.

That is, the thoroughly-steamed flesh extract 142 obtained through the thorough-steaming process of FIGS. 5*a*-5*c*, is put into a sterile glass jar 144 as shown in FIG. 6(*a*) and FIG. 6(*b*). The glass jar containing the flesh extract 142 is then boiled in a water bath 146 with the lid 148 of the glass jar 144 tightly sealed, as shown in FIGS. 6(*c*) and 6(*d*), to vacuum seal the inside of the glass jar and prevent the jam from being spoiled. The glass jar is cooled down at room temperature thereafter.

Final Ripening Process

Figure 7:
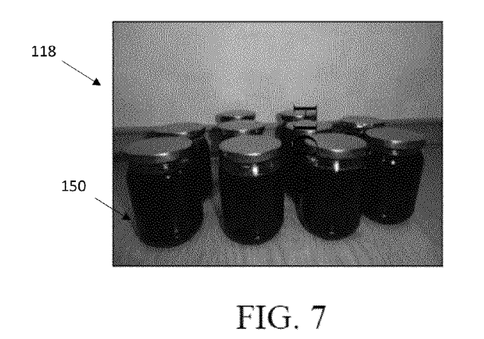
FIG. 7 shows a respective picture for a final ripening process in the method for manufacturing a jam using *Acanthopanax senticosus* fruits according to an exemplary embodiment of the present invention.

The final ripening process 118 of the present invention is a process, wherein after the vacuum packing process, the vacuum-sealed glass jar 150 is stored in a ripening room for 7 days to 15 days for additional ripening, as shown in FIG. 7. Further ripening the jam manufactured using the *Acanthopanax senticosus* fruits, allows the jam to maintain its unique deep and special taste for a long period of time.

In particular, the ripening room is preferably set at a temperature from 13° C. to 16° C. When the temperature is maintained outside the above range, the ripening level of the manufactured using the *Acanthopanax senticosus* fruits may deteriorate and the above-mentioned efficacies of the *Acanthopanax senticosus* fruits may also decrease.

Figure 8A:
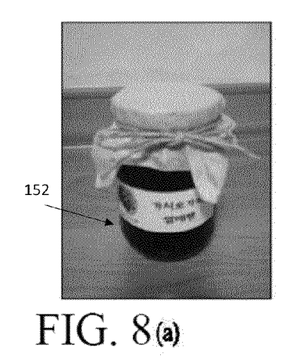
FIGS. 8a-8c shows pictures of a jam manufactured using *Acanthopanax senticosus* fruits according to an exemplary embodiment of the present invention.
Figure 8B:
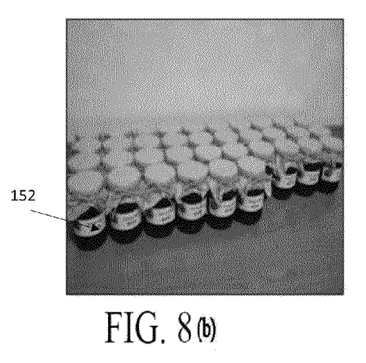
Figure 8C:
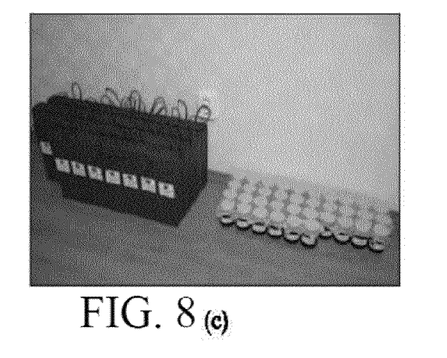

As such, a jam using the *Acanthopanax senticosus* fruits is manufactured. The finally manufactured jams 152 according to the method of the present invention are shown in FIGS. 8(*a*)-8(*c*).

Herein below, the method of manufacturing a jam using the *Acanthopanax senticosus* fruits are explained in further detail with reference to the Preparation Examples.

Preparation Example 1

*Acanthopanax senticosus* fruits were mashed and sugar was added using a mix ratio of 4 kilograms (kg) of sugar relative to 10 kg of the *Acanthopanax senticosus* fruits. The mixture was added into a container and the container's mouth was covered with a cloth and tightly sealed with a rubber band.

Then, the container was stored in a fermentation room set at 26° C. for 4 months, during which the container was opened 3 times a week and the mixture of *Acanthopanax senticosus* fruits and sugar were evenly mixed and fermented, and ripened by storing the container in a ripening room set at 15° C. for 4 months.

10 kg of the thus fermented and ripened *Acanthopanax senticosus* fruits were heated, added with 10 liters (L) of mineral water, and the seeds and skins were separated out by compressing the mixture using a sieve 3 times and a flesh extract of the *Acanthopanax senticosus* fruits was finally obtained.

In addition, the thus obtained flesh extract was boiled down by heating while stirring with a wooden spatula, added with 1.2 kg of sugar, boiled down further, steamed while stirring under reduced heat, added with 0.1 grams (g) of salt, and then steamed further.

Furthermore, the thoroughly steamed flesh extract was put into a sterilized glass jar, boiled with the lid of the glass jar tightly sealed, and cooled down at room temperature to vacuum seal the inside of the glass jar. Then, the glass jar was stored in a ripening room set at 15° C. for 11 days and finally obtained a jam using the *Acanthopanax senticosus* fruits according to an exemplary embodiment of the present invention.

Preparation Example 2

*Acanthopanax senticosus* fruits were mashed and sugar was added using a mixed ratio of 3 kg of sugar relative to 10 kg of the *Acanthopanax senticosus* fruits. The mixture was added into a container and its mouth was covered with a cloth and tightly sealed with a rubber band.

Then, the container was stored in a fermentation room set at 25° C. for 3 months, during which the container was opened 2 times a week and the mixture of *Acanthopanax senticosus* fruits and sugar were evenly mixed and fermented, and ripened by storing the container in a ripening room set at 13° C. for 3 months.

10 kg of the thus fermented and ripened *Acanthopanax senticosus* fruits were heated, added with 9 L of mineral water, and the seeds and skins separated by compressing the mixture using a sieve 2 times, and a flesh extract of the *Acanthopanax senticosus* fruits was finally obtained.

In addition, the thus obtained flesh extract was boiled down by heating while stirring with a wooden spatula, added with 0.9 kg of sugar, boiled down further, steamed while stirring under reduced heat, added with 0.1 g of salt and then steamed further.

Furthermore, the thoroughly steamed flesh extract was put into a sterilized glass jar, boiled with the lid of the glass jar tightly sealed, and cooled down at room temperature to vacuum seal the inside of the glass jar. Then, the glass jar was stored in a ripening room set at 13° C. for 8 days and finally obtained a jam using the *Acanthopanax senticosus* fruits according to an exemplary embodiment of the present invention.

Preparation Example 3

*Acanthopanax senticosus* fruits were mashed and sugar was added with a mixed ratio of 5 kg of sugar relative to 10 kg of the *Acanthopanax senticosus* fruits. The mixture was added into a container and its mouth was covered with a cloth and tightly sealed with a rubber band.

Then, the container was stored in a fermentation room set at 27° C. for 5 months, during which the container was opened 3 times a week and the mixture of *Acanthopanax senticosus* fruits and sugar were evenly mixed and fermented, and ripened by storing the container in a ripening room set at 16° C. for 5 months.

10 kg of the thus fermented and ripened *Acanthopanax senticosus* fruits were heated, 13 L of mineral water was added, and the seeds and skins separated by compressing the mixture using a sieve 3 times and a flesh extract of the *Acanthopanax senticosus* fruits was finally obtained.

In addition, the thus obtained flesh extract was boiled down by heating while stirring with a wooden spatula, added with 1.3 kg of sugar, boiled down further, steamed while stirring under reduced heat, added with 0.1 g of salt and then steamed further.

Furthermore, the thoroughly steamed flesh extract was put into a sterilized glass jar, boiled with the lid of the glass jar tightly sealed, and cooled down at room temperature to vacuum seal the inside of the glass jar. Then, the glass jar was stored in a ripening room set at 16° C. for 14 days and finally obtained a jam using the *Acanthopanax senticosus* fruits according to an exemplary embodiment of the present invention.

When the jam manufactured using the *Acanthopanax senticosus* fruits according to the exemplary embodiments of the present invention can be conveniently eaten by spreading it on breads or cakes. The jam did not give any repulsion due to the unique sweet taste of the jam and also provided the unique deep flavor of the *Acanthopanax senticosus* fruits. Further, the jam was able to be stored for a long term period and believe that it would help people to stay healthy due to its useful pharmacological actions.

What is claimed:

1. A method for manufacturing jam using *Acanthopanax senticosus* fruits, comprising:
   a washing and drying process, wherein a plurality of *Acanthopanax senticosus* fruits are washed and dried;
   an adding process, wherein the *Acanthopanax senticosus* fruits are mashed, added with 30-50 parts by weight of sugar relative to 100 parts by weight of the *Acanthopanax senticosus* fruits, and mixed thereafter;
   a sealing process, wherein the *Acanthopanax senticosus* fruits with the added sugar are put into a container, and a mouth of the container is covered with a cloth or Hanji and sealed with a rubber band;
   a fermentation process, wherein the container is stored in a fermentation room set at 25-27° C. for 3 months to 5 months to ferment the *Acanthopanax senticosus* fruits and the container is opened a plurality of times to stir the mixture of the *Acanthopanax senticosus* fruits and sugar so that oxygen can be supplied into the container and gas is released from the container;
   a ripening process, wherein the container is stored in a ripening room set at 13-16° C. for 3 months to 5 months to ripen the *Acanthopanax senticosus* fruits;
   a process of obtaining a flesh extract of the *Acanthopanax senticosus*, wherein the fermented and ripened *Acanthopanax senticosus* fruits are heated, added with 50-150 parts by weight of mineral water relative to 100 parts by weight of the *Acanthopanax senticosus* fruits, seeds and skins of the *Acanthopanax senticosus* are separated from the fermented and ripened *Acanthopanax senticosus* fruits using a sieve to sieve out a flesh extract, and the sieved flesh extract is compressed a plurality of times using the sieve to obtain the final flesh extract of the *Acanthopanax senticosus*;
   a process of boiling down the final flesh extract of the *Acanthopanax senticosus*, wherein a heat is applied to the final flesh extract of the *Acanthopanax senticosus* and the final flesh extract of the *Acanthopanax senticosus* is boiled down while stirring, and 5-15 parts by weight of sugar relative to 100 parts by weight of the final flesh extract of the *Acanthopanax senticosus* is added thereto;
   a process of steaming, wherein the heat applied to the final flesh extract is reduced and 0.05-0.1 parts by weight of salt relative to 100 parts by weight of the boiled-down final flesh extract of the *Acanthopanax senticosus* is added while stifling;
   a vacuum packing process, wherein the steamed flesh extract of the *Acanthopanax senticosus* is put into a glass jar and boiled in a water bath with a lid of the glass jar tightly sealed and cooled to vacuum seal the inside of the glass jar; and
   a final ripening process, wherein the glass jar is stored in a shaded ripening room set at 13-16° C. for a period of 7-15 days to ripen the steamed flesh extract of the *Acanthopanax senticosus*.

* * * * *